July 15, 1947.  J. L. HIPPLE  2,424,168
MATERIAL DISPENSING DEVICE HAVING A ROLLER WITH DISCHARGE CONTROLLER
Filed Oct. 28, 1943  2 Sheets-Sheet 1

Inventor:
James L. Hipple
By: Paul O. Pippel
Atty

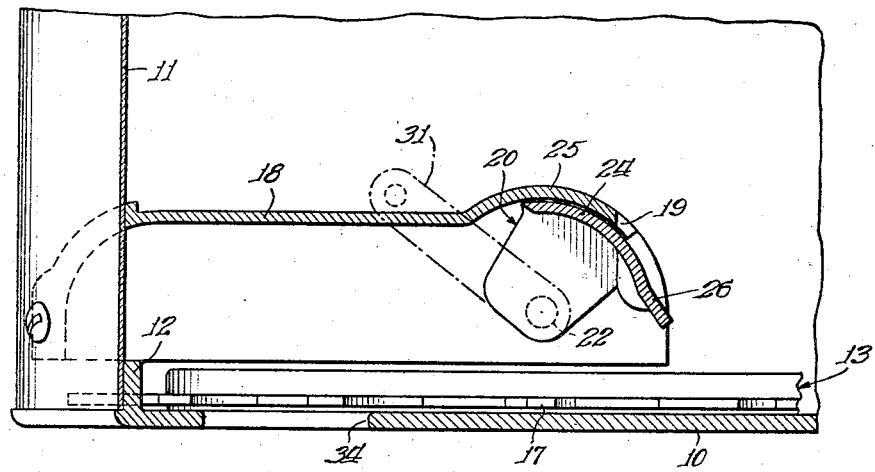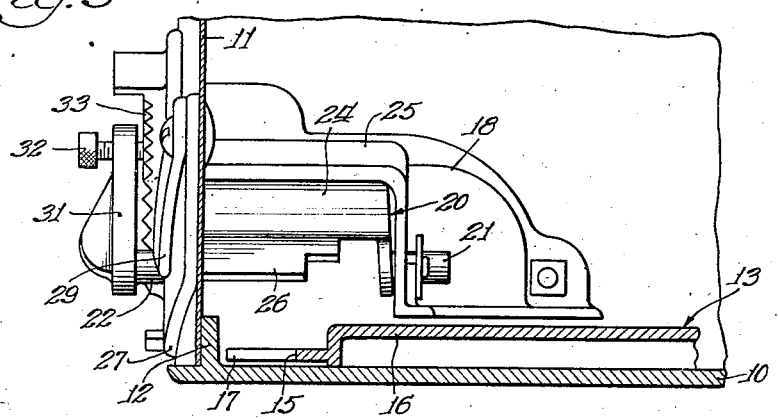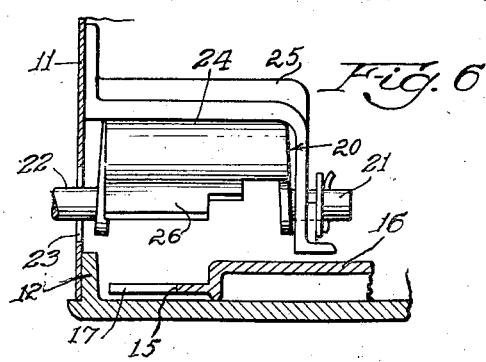

Patented July 15, 1947

2,424,168

UNITED STATES PATENT OFFICE 2,424,168

MATERIAL DISPENSING DEVICE HAVING A ROLLER WITH DISCHARGE CONTROLLER

James L. Hipple, Canton, Ill., assignor to International Harvester Company, a corporation of New Jersey Application October 28, 1943, Serial No. 507,935

3 Claims. (Cl. 222—311)

This invention relates to a material dispensing device. More particularly, it relates to a fertilizer measuring and distributing mechanism.

The principal object of the invention is to provide an improved simplified fertilizer distributing mechanism provided with means for readily and accurately adjusting the amount of material discharged.

Other objects of the invention will be more clearly understood by referring to the accompanying drawings, in which:

Figure 4 is a section taken on the line 4—4 of Figure 1;

Figure 5 is a section taken on the line 5—5 of Figure 1; and

Figure 6 is a section similar to Figure 5, but with certain parts omitted.

Figure 1:
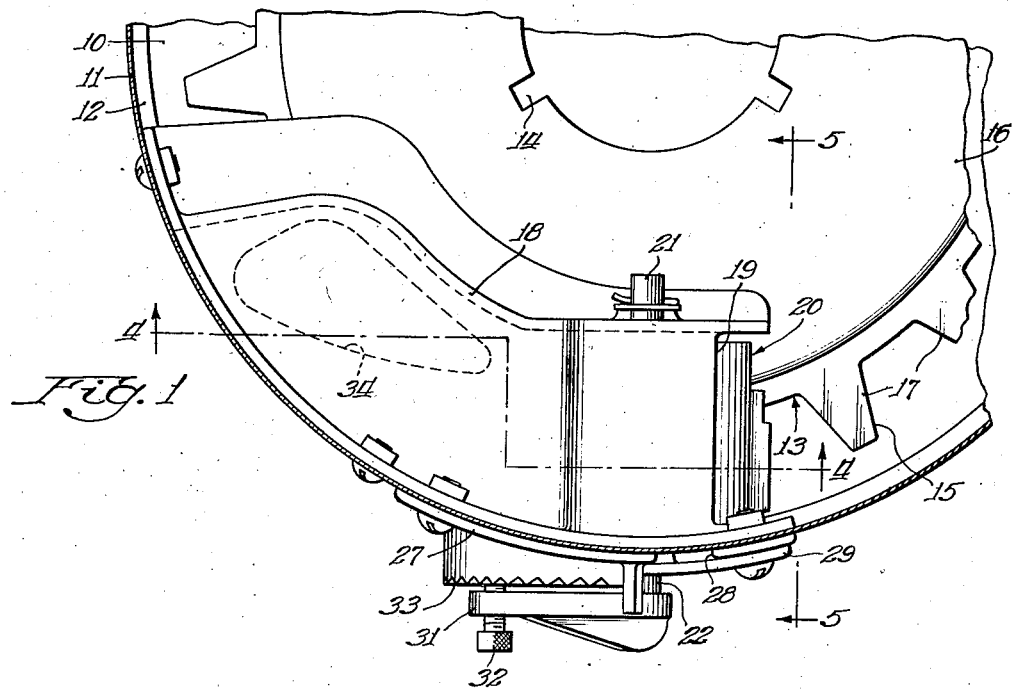
Figure 1 is a plan view of a part of a hopper embodying the dispensing device.
Figure 2:
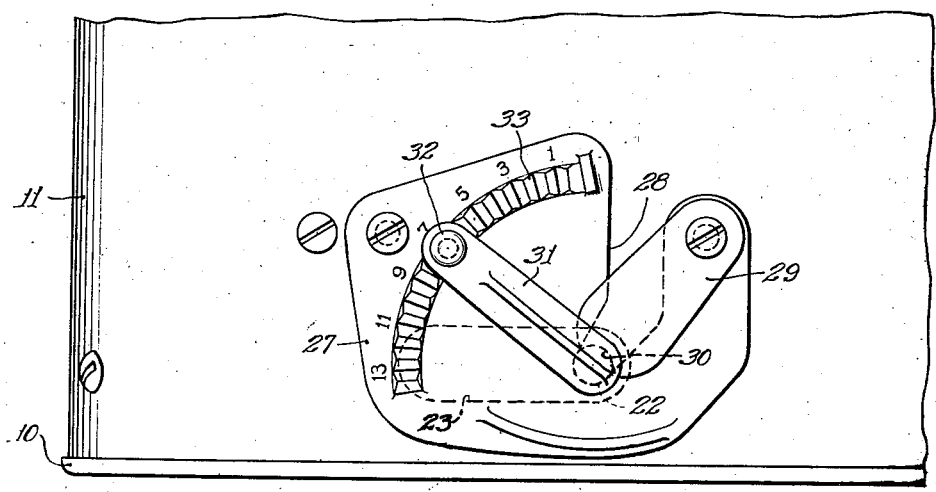
Figure 2 is an elevation showing the portion of the device outside the hopper and the delivery adjusting means.
Figure 3:
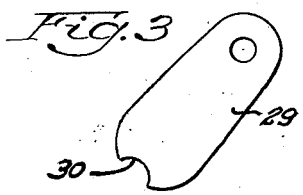
Figure 3 is a detail of the lock for holding the distributor gate in operating position.

As illustrated, only a portion of a hopper has been shown as the invention resides in the distributing mechanism. This mechanism is adapted for use on a conventional type of dispensing device, as shown in United States Patent No. 1,405,037, January 31, 1922.

The hopper includes a bottom 10 and a vertical wall portion formed as a cylindrical can 11, which is secured to an upwardly extending flange 12 formed on the bottom 10.

A feed wheel 13 is removably mounted on lugs 14 of the driving member which may be driven by any suitable means, such, for example, as shown in the above-mentioned patent.

The feed wheel 13 is provided with a plurality of peripheral notches 15 to provide pockets for receiving the material to be dispensed. A central portion 16 of the feed wheel is elevated, as shown in Figure 5, above the bottom 10 of the hopper. This construction provides an annular space above the material-receiving pockets 15 to assure loading of the pockets with material during rotation of the feed wheel. Figure 1 shows a feed wheel having large pockets formed by spaced teeth-like members 17. Other types of feed wheels may, of course, be utilized, if desired, to provide smaller pockets and further control the rate of fertilizer delivery.

A housing 18 is mounted in spaced relation above a portion of the periphery of the feed wheel. Said housing has a portion shaped to fit the wall of the hopper, being secured thereto by a plurality of bolts. The housing encloses a space except for an opening 19 at one end which is controlled by a delivery gate 20.

The delivery gate 20 is formed with a pair of coaxial trunnions, an inner trunnion 21 being journaled in the housing 18 and an outer trunnion 22 extending through an elongated opening 23 in the wall 11 of the hopper. A washer and key retain the inner trunnion rotatably in position with respect to the housing 18. Said gate is provided with a cylindrical segment portion 24 which overlaps a mating cylindrical portion 25 formed on the housing 18. Said cylindrical portion 24 is provided with a terminating lip 26 which controls the amount of material carried into the housing depending on the angular adjustment of the delivery gate.

A supporting member 27 secured by bolts to the outer side of the hopper wall 11 is provided with a slot 28, the bottom of which provides a semicylindrical journal for the trunnion 22. To complete the journal and to provide means for holding the delivery gate in position, a locking member 29 secured to the supporting member 27 is provided with a notched end 30 which engages the trunnion 22.

For adjusting the delivery gate, an arm 31 secured to the trunnion 22 is held in one of a plurality of positions by a set screw 32, which engages serrations 33 formed around an arc on the supporting member 27. The delivery gate is readily removed from the hopper by withdrawing the arm 31 through the opening 23. This is accomplished by removing the supporting member 27, releasing locking member 29, and removing the bolts securing the housing 18 to the hopper. The arm 31 is not withdrawn through opening 23 by moving the gate 20 in an axial direction, but by tilting or twisting the gate to cause the portion of arm 31 adjacent trunnion 22 to first pass through the opening, and then working the remainder of the arm therethrough. Trunnion 21 of the gate 20 is held against displacement with respect to housing 18 by a conventional cotter pin and, if desired, the gate may be separated from the housing by merely removing the pin.

The operation of the dispensing mechanism forming this invention has been described along with the description of the drawings. The hopper is filed with material to be measured and dispensed and is carried around by the feed wheel 13. The amount of material carried into the delivery gate housing 18 is determined by the location of the gate 20 and particularly by the location of the lip 26 on said gate. As the feed wheel rotates underneath the housing, an opening 34 formed in the bottom 10 of the hopper is passed over by the periphery of the feed wheel. The size and number of the notches in the feed wheel and the speed of the feed wheel together determine the amount of material discharged through the opening 34.

A particular embodiment of my invention has been illustrated and described. It will be understood that all modifications falling under the appended claims are contemplated as a part of the invention.

What is claimed is:

1. A valve mechanism for use with a material measuring and distributing device including a hopper and a feed wheel rotatably mounted above the bottom of the hopper and provided with a plurality of peripheral material measuring pockets, said mechanism comprising a housing enclosing a space above a portion of said wheel and being spaced from the wheel and secured to the hopper wall, a delivery gate mounted on said housing, said gate being provided with a pair of coaxial trunnions, the inner trunnion being journaled in the housing at a point spaced above the feed wheel and the outer trunnion extending through the hopper wall, said gate being provided with a substantially cylindrical segment portion and said housing being formed with an overlapping mating cylindrical segment portion, the lower edge of said gate being adjustable with respect to the feed wheel by angular movement of the gate about its trunnion axis, a removable supporting member secured to the outer side of the hopper wall, said member being formed with a journal for the outwardly extending trunnion, an adjusting arm secured to said trunnion, a serrated quadrant formed on the supporting member, and means to adjustably secure said arm to said quadrant.

2. A valve mechanism for use with a material measuring and distributing device including a hopper and a feed wheel rotatably mounted above the bottom of the hopper and provided with a plurality of peripheral material measuring pockets, said mechanism comprising a housing enclosing a space above a portion of said wheel and being spaced from the wheel and secured to the hopper wall, a delivery gate mounted on said housing, said gate being provided with a pair of coaxial trunnions, the inner trunnion being journaled in the housing and the outer trunnion extending through the hopper wall, the lower edge of said gate being adjustable with respect to the feed wheel by angular movement of the gate about its trunnion axis, a removable supporting member secured to the outer side of the hopper wall, said member being formed with a journal for the outwardly extending trunnion, said journal including an open-ended slot in the member to receive the trunnion, and releasable means carried by the member and engageable with said trunnion to hold the latter in the slot.

3. A valve mechanism for use with a material measuring and distributing device including a hopper and a feed wheel rotatably mounted above the bottom of the hopper and provided with a plurality of peripheral material measuring pockets, said mechanism comprising a housing enclosing a space above a portion of said wheel and being spaced from the wheel and secured to the hopper wall, a delivery gate mounted on said housing, said gate being provided with a pair of coaxial trunnions, the inner trunnion being journaled in the housing and the outer trunnion extending through the hopper wall, the lower edge of said gate being adjustable with respect to the feed wheel by angular movement of the gate about its trunnion axis, a removable supporting member secured to the outer side of the hopper wall, said member being formed with a journal for the outwardly extending trunnion, said journal including an open-ended slot in the member to receive the trunnion, and a notched locking arm engaging the trunnion and forming a part of said journal adapted to releasably hold the trunnion in the slot.

JAMES L. HIPPLE.

REFERENCES CITED

The following references are of record in the file of this patent:

UNITED STATES PATENTS

| Number | Name | Date |
|---|---|---|
| 479,637 | Everett | July 26, 1892 |
| 635,112 | Wheildon | Oct. 19, 1899 |